United States Patent [19]

Brown

[11] 4,094,395
[45] June 13, 1978

[54] TWO PIECE DRIVEN PLATE ASSEMBLY

[75] Inventor: William Lee Brown, Chicago, Ill.

[73] Assignee: Borg-Warner Corporation, Chicago, Ill.

[21] Appl. No.: 720,040

[22] Filed: Sep. 2, 1976

[51] Int. Cl.² ............................................. F16D 3/14
[52] U.S. Cl. ................................. 192/106.2; 64/27 C
[58] Field of Search ..................... 192/106.2, 106.1; 64/27 C

[56] References Cited

U.S. PATENT DOCUMENTS

| | | | |
|---|---|---|---|
| 1,750,828 | 3/1930 | Wemp | 192/106.2 X |
| 2,076,373 | 4/1937 | Katcher | 192/106.2 |
| 2,127,996 | 8/1938 | Havill | 64/27 C X |
| 2,221,463 | 11/1940 | Wolfram | 192/106.2 |
| 3,799,309 | 3/1974 | Cook | 192/106.2 |

FOREIGN PATENT DOCUMENTS 892,116  10/1953   Germany ..................... 192/106.2

*Primary Examiner*—Benjamin W. Wyche
*Attorney, Agent, or Firm*—James A. Geppert

[57] ABSTRACT

A driven plate assembly of the vibration damper type comprising a one-piece stamped clutch hub and a driven plate having friction surfaces toward the outer periphery thereof, the hub having a radial flange with projections formed therein to pilot the driven plate relative thereto.

19 Claims, 8 Drawing Figures

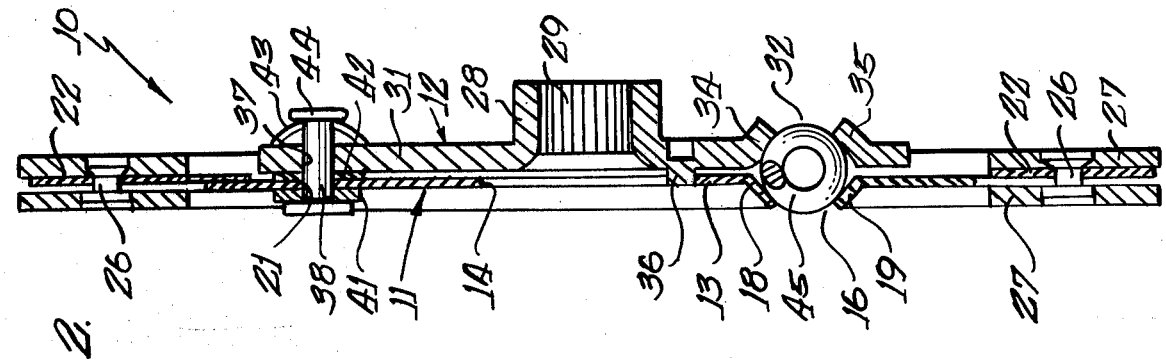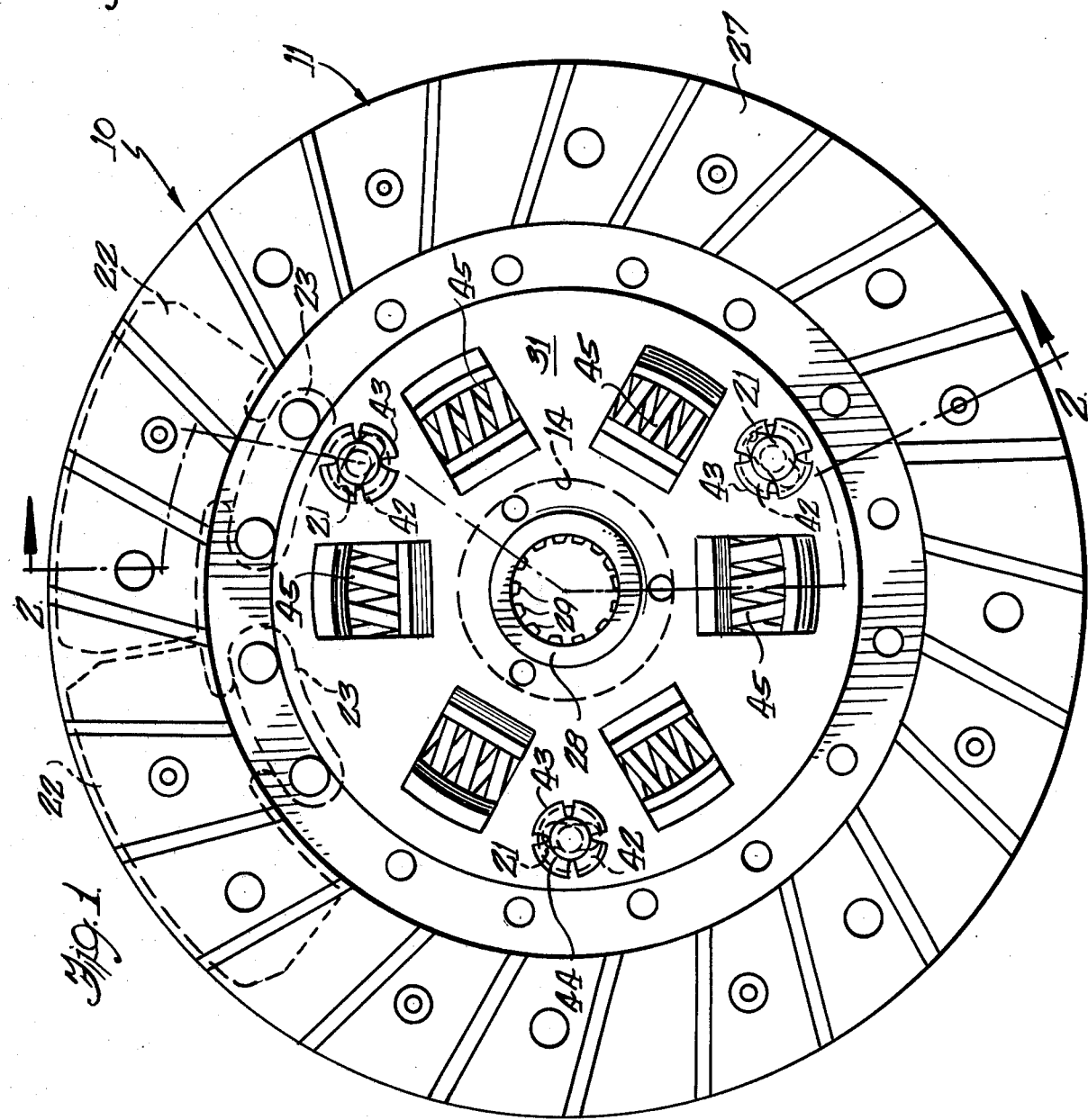

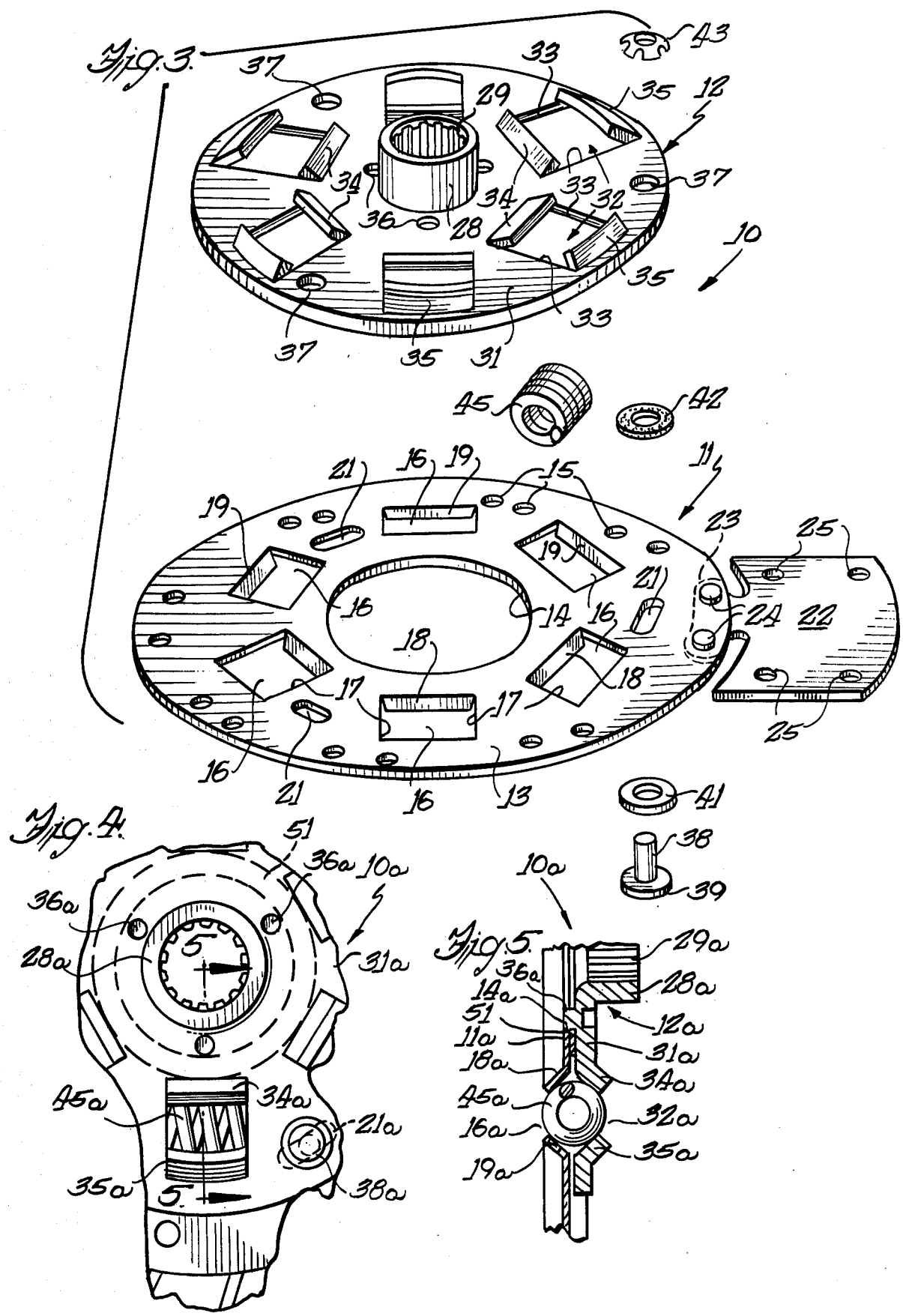

TWO PIECE DRIVEN PLATE ASSEMBLY

BACKGROUND AND SUMMARY OF THE INVENTION

Automotive clutches have utilized vibration damper means in the clutch driven plate ahead of a manually operated transmission for the purpose of neutralizing torsional vibrations emanating from the engine which would otherwise cause disturbing noises in the transmission and driveline. In its simplest form, a conventional vibration damper assembly comprises a hub having a radial flange surrounded on one side by a friction disc and on the opposite side by a spring retainer disc. These elements are formed with circumferentially spaced groups of registering apertures receiving therein resilient means such as compression coil springs. Normally, spacers or spring washers are positioned between the plates.

The present invention provides a simplified driven plate assembly utilized as a vibration damper wherein the usual two element drive member and single element driven member are replaced by a single element drive member and a single element driven member, thereby reducing the number of major parts. The spring windows are formed in the two members and an improved stop pin arrangement is used in the assembly wherein the usual shoulder pins are replaced with simple rivets.

The present invention also comprehends a novel two-piece driven plate assembly wherein the stop pin assembly includes simple rivets that extend through circumferentially spaced arcuate slots in one member and through openings in the other member and are headed over Belleville springs acting to hold the assembly together. This arrangement places the hub flange and friction disc closer together, thus reducing the angular thrust force of the damper springs under load tending to separate the two members. Individual friction washers on each rivet are loaded by the Belleville springs to provide damping friction for the assembly.

The present invention further comprehends the provision of a two-piece driven plate assembly utilizing a one-piece stamped clutch hub. The hub includes a barrel and integral flange with the barrel extending entirely from one side of the flange. The flange includes a plurality of circumferentially spaced spring windows having inner and outer spring retaining lips extending from the barrel side and a plurality of extruded bosses adjacent the barrel and extending from the opposite side of the flange. The bosses act to pilot the friction clutch plate thereto and retain the concentricity between the two members. The clutch plate also has spring windows aligned with the windows in the hub flange and having inner and outer spring retaining lips.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a front elevational view of the two piece driven plate assembly taken from the right-hand side of FIG. 2.

FIG. 2 is a vertical cross sectional view taken on the irregular line 2—2 of FIG. 1.

FIG. 3 is an exploded perspective view of the driven plate assembly of FIGS. 1 and 2.

FIG. 4 is a partial front elevational view of an alternate embodiment of driven plate assembly.

FIG. 5 is a vertical cross sectional view taken on line 5—5 of FIG. 4.

DESCRIPTION OF THE PREFERRED EMBODIMENTS

Figure 6:
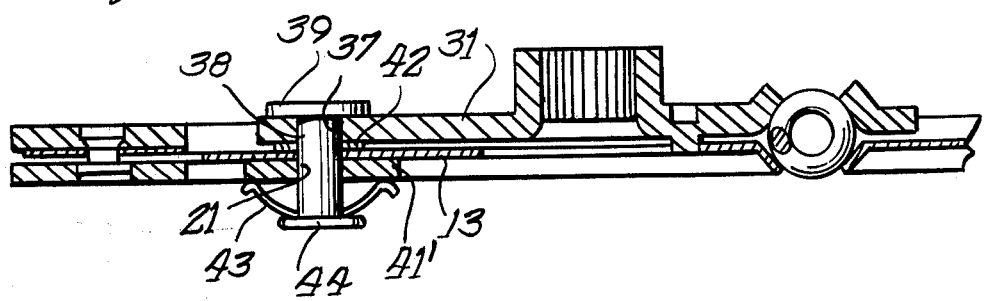
FIG. 6 is a partial enlarged cross sectional view of the rivet and spring assembly with the parts reversed.

Referring more particularly to the disclosure in the drawings wherein are shown illustrative embodiments of the present invention, FIGS. 1, 2 and 3 disclose a two-piece driven plate or vibration damper assembly 10 including a friction clutch plate 11 and a hub 12. The friction clutch plate 11 comprises an annular plate 13 having a central opening 14, a plurality of openings 15 adjacent the outer periphery and a plurality of substantially equally circumferentially spaced spring pockets 16. Each spring pocket includes opposite end surfaces 17, 17, an outwardly and upwardly curved inner spring retaining lip 18 and an outwardly and downwardly curved outer spring retaining lip 19.

A plurality of arcuate slots 21, shown as three in number, are equally spaced around the plate 13 and positioned between adjacent pairs of spring pockets 16 and radially outwardly of the pockets. A plurality of circumferentially spaced radially outwardly extending spring cushions 22 are secured by mounting tabs 23 to the outer periphery of the plate 13 through rivets 24 received in the openings 15 and aligned openings in the tabs. Mounted on the spring cushions 22 by rivets 26 in openings 25 in the cushions are annular friction facings 27 on the opposite sides thereof, with the friction facings adapted to be positioned between driving members of a suitable clutch assembly.

The one-piece clutch hub 12 is stamped from flat sheet stock, such as Republic MaxiForm 50 sheet steel, and is provided with a barrel 28 and an integral radially outwardly extending flange 31; the barrel being formed entirely on one side of the flange. The barrel is provided with suitable internal splines 29 to provide an operative connection with a driven shaft. Formed within the flange are a plurality of spring pockets 32 corresponding in number with the spring pockets 16 in the plate 13. Each pocket has opposite ends 33, an outwardly and upwardly inclined inner spring retaining lip 34 and an outwardly and downwardly inclined outer spring retaining lip 35; the lips 34 and 35 projecting from the flange on the same side as the barrel 28. A plurality of piloting means or extruded bosses 36, shown as three in number, are formed in the flange closely adjacent to but projecting from the opposite side of the flange than the barrel 28. The bosses 36 are received in the central opening 14 of the plate 13 and act to pilot the plate relative to the hub and preserve the concentricity between these two parts.

Adjacent the outer periphery of the flange are openings 37 corresponding in number to and aligned with the arcuate slots 21 in the plate 14. The slots 21 and openings 37 receive conventional rivets 38 adapted to both hold the assembly together and act as stop pins for the vibration damper function. Each rivet 38 is provided with a washer 41 between the enlarged rivet head 39 and the plate 13, a friction washer 42 between the plate 13 and flange 31 and a small Belleville or diaphragm spring 43 at the exterior of the flange 31. The rivet passes through the washer 41, the arcuate slot 21, the friction washer 42, the opening 37 and the Belleville spring 43 to be headed at 44 (see FIG. 2) so as to compress the Belleville spring and develop the required friction lag as well as hold the assembly together. A plurality of compression coil springs 45 are positioned under some desired degree of compression in the spring pockets 16, 32.

In assembly, the springs 45 are positioned in the spring pockets 16, 32, and the friction washers 42 are aligned with the openings 37 and slots 21 between the plates. The rivets 38 are inserted in the washers 41, slots 21, friction washers 42, openings 37 and Belleville springs 43, and each rivet is compressed to a predetermined height and headed at 44 to compress the Belleville spring 43 at the midpoint of compression which would actually hold the assembly 10 together. At the same time, pressure would be applied on the friction washers 42 to develop the required friction lag. By changing the Belleville spring size and/or the friction material of the washer 42, friction lag requirements can be varied with the present design. Also, the use of conventional rivets places the hub flange and plate closer together thus reducing the angular thrust force of the damper springs 45 under load tending to separate the two.

FIGS. 4 and 5 disclose an alternate embodiment of vibration damper 10a including a friction clutch plate 11a and a hub 12a. The plate 11a is annular with a central opening 14a and has a plurality of circumferentially spaced spring pockets 16a having inner and outer lips 18a, 19a to retain a damper spring 45a therein. The hub 12a includes a barrel 28a having internal splines 29a and an integral radial flange 31a, with the barrel extending from only one side of the flange. The flange has spring pockets 32a with inner and outer spring retaining lips 34a and 35a, respectively, and extruded bosses 36a to pilot the plate 11a thereon and preserve the concentricity of the assembly. The rivets 38a are provided to act as stop pins with slots 21a in the plate 11a and openings in the flange, but the friction washers on the rivets have been omitted and replaced by a single annular friction ring 51 positioned between the plate 11a and the flange 31a (see FIG. 5). The friction ring 51 is piloted onto the bosses 36a to retain the concentricity of the assembly.

FIG. 6 discloses the rivet assembly with the position of the spring 43 and rivet 38 reversed relative to the clutch hub flange 31 and annular plate 13. The rivet 38 is inserted through the opening 37 in the flange 31, friction washer 42, arcuate slot 21 and a washer 41'; the rivet head 39 abutting the flange 31 and the Belleville spring 43 fitting on the rivet to engage the washer 41'. The rivet is headed at 44 to suitably compress the spring 43 and provide the requisite friction lag. Thus, the Belleville spring can be positioned on either side of the damper assembly.

Figure 7:
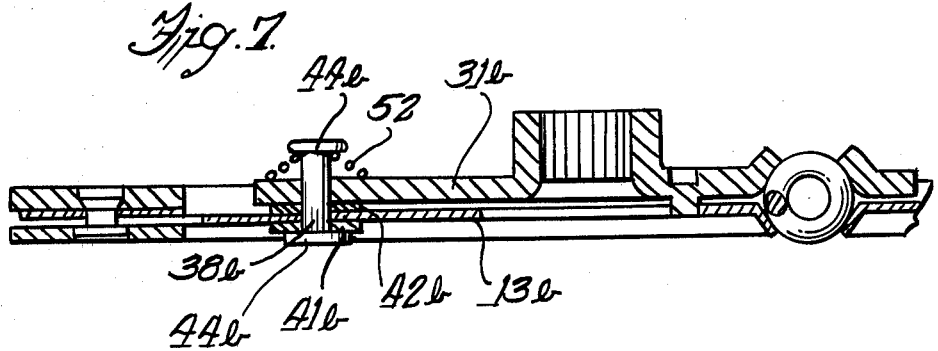
FIG. 7 is a partial enlarged cross sectional view of the rivet assembly with a coil conical spring.

FIG. 7 relates to an alternate rivet assembly utilizing a coil conical spring 52 in the place of the Belleville spring. As shown, the rivet 38b extends through the washer 41b, the slot in annular plate 13b, the friction washer 42b, the opening in the flange 31b and the center of the conical spring 52 to be headed at 44b. The coil conical spring 52 has its large diameter end biased against the flange 31b and its small diameter end just encompassing the rivet 38b and abutting the headed end 44b. This spring functions in the same manner as the Belleville spring shown in FIGS. 1-3.

Figure 8:
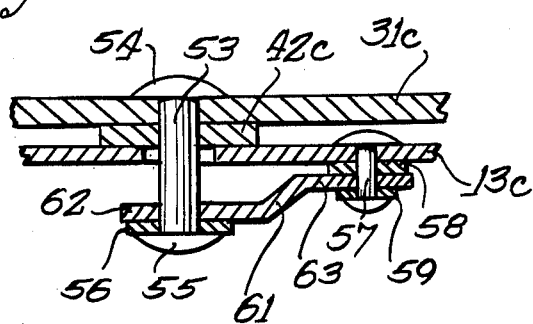
FIG. 8 is a partial enlarged cross sectional view of a rivet assembly using an offset strap.

FIG. 8 discloses a third embodiment of rivet assembly utilizing an offset strap 61 acting to pull the flange 31c and the plate 13c together. In this embodiment, an elongated rivet 53 extends through the opening in the flange 31c, the friction washer 42c and the slot in the plate 13c and is headed at 55 spaced from the plate 13c; the opposite rivet end has a head 54 abutting the flange 31c. A washer 56 is positioned between the rivet head 55 and an end 62 of the strap 61 having an opening receiving the rivet. A second rivet 57 extends through a second opening in the plate 13c, a washer 58, the opposite end 63 of the strap and a washer 59. This rivet is headed at its opposite ends to firmly secure the washers and strap to the plate 13c.

The strap 61 provides a yieldable biasing member acting to pull the plate 13c and the hub together, the offset of the strap between the ends 62 and 63 providing the yieldable portion. Thus, the elongated rivet 53 provides for a limited amount of axial movement of the plate 13c away from the flange 31c under the angular thrust force exerted by the damper springs under load. However, the strap end 62 abuts the washer 56 and rivet end 55, and the offset nature of the strap 61 acts to urge the strap end 63 against the washer 57 and the plate 13c to pull the plates together.

In all assemblies, the hub is a one-piece stamped member with the bosses extruded during the stamping operation. While three round projections or bosses are shown, obviously any convenient number of bosses and/or other shapes therefor may be utilized without departing from the spirit or intent of this invention.

I claim:

1. A one-piece stamped hub element for a two-piece clutch plate assembly having coil springs between such element and its friction clutch plate, comprising a barrel and an integral flange, said barrel extending entirely from one side of said flange, said flange having spring pockets receiving the coil springs with each pocket having an inner and an outer spring retaining lip, and pivoting means on said flange for positioning of said friction clutch plate including a plurality of bosses projecting from the side of said flange opposite but closely adjacent to said barrel, said bosses being extruded from the flange during a stamping operation to form the hub element.

2. A one-piece stamped hub element as set forth in claim 1, in which said spring retaining lips extend from the side of said flange opposite to said bosses.

3. A two-piece driven plate assembly comprising a one-piece stamped hub element and a friction clutch plate carrying friction surfaces adjacent the periphery thereof, the hub element having a central barrel and an integral radial flange, the barrel extending entirely from one surface of said flange, said friction clutch plate having a central opening, damper springs mounted between said plate and flange, stop means limiting relative rotation between said plate and hub element, friction means positioned between said plate and hub element, and piloting means on said hub element cooperating with said plate to preserve the concentricity therebetween including a plurality of generally equally circumferentially spaced bosses projecting from the side of the flange opposite to said barrel and received in the central opening in said plate.

4. A two-piece driven plate assembly as set forth in claim 3, wherein said plate has a plurality of circumferentially equally spaced spring pockets therein, said flange having a plurality of spring pockets therein aligned with the spring pockets in said plate, each of said spring pockets in the plate and flange having inner and outer spring retaining lips, each pair of aligned spring pockets receiving a damper spring.

5. A two-piece driven plate assembly as set forth in claim 3, wherein said stop means includes a plurality of rivets, one of said plate or hub element having an arcuate slot receiving each rivet and the other of said plate or hub element having an opening aligned with said rivet, and spring means cooperating with each rivet to bias the plate and hub element together.

6. A two-piece driven plate assembly as set forth in claim 5, in which said friction means includes a friction washer received on each rivet.

7. A two-piece driven plate assembly as set forth in claim 5, in which said spring means comprises a conical coil spring positioned on and compressed by each rivet and engaging the surface of said flange on said clutch plate.

8. A two-piece driven plate assembly comprising a one-piece stamped hub element and a friction clutch plate carrying friction surfaces adjacent the periphery thereof, the hub element having a central barrel and an integral radial flange, the barrel extending entirely from one surface of said flange, said friction clutch plate having a central opening, damper springs mounted between said plate and flange, stop means limiting relative rotation between said plate and hub element and including a plurality of rivets, one of said plate or hub element having an arcuate slot receiving each rivet and the other of said plate or hub element having an opening aligned with said rivet, said rivets being located on a circle generally aligned with the outer edges of said damper springs, spring means cooperating with each rivet to bias the plate and hub element together, friction means positioned between said plate and hub element, and piloting means on said hub element cooperating with said plate to preserve the concentricity therebetween.

9. A two-piece driven plate assembly comprising a one-piece stamped hub element and a friction clutch plate carrying friction surfaces adjacent the periphery thereof, the hub element having a central barrel and an integral radial flange, the barrel extending entirely from one surface of said flange, said friction clutch plate having a central opening, damper springs mounted between said plate and flange, stop means limiting relative rotation between said plate and hub element and including a plurality of rivets, one of said plate or hub element having an arcuate slot receiving each rivet and the other of said plate or hub element having an opening aligned with said rivet, spring means cooperating with each rivet to bias the plate and hub element together, friction means positioned between said plate and hub element, and piloting means on said hub element cooperating with said plate to preserve the concentricity therebetween, said friction means comprising a friction ring piloted on said piloting means.

10. A two-piece driven plate assembly comprising a one-piece stamped hub element and a friction clutch plate carrying friction surfaces adjacent the periphery thereof, the hub element having a central barrel and an integral radial flange, the barrel extending entirely from one surface of said flange, said friction clutch plate having a central opening, damper springs mounted between said plate and flange, stop means limiting relative rotation between said plate and hub element and including a plurality of rivets, one of said plate or hub element having an arcuate slot receiving each rivet and the other of said plate or hub element having an opening aligned with said rivet, spring means cooperating with each rivet to bias the plate and hub element together and including a Belleville spring positioned on and compressed by each rivet and engaging the surface of said flange on the same side as said barrel, friction means positioned between said plate and hub element, and piloting means on said hub element cooperating with said plate to preserve the concentricity therebetween.

11. A two-piece drive plate asembly comprising a one-piece stamped hub element and a friction clutch plate carrying friction surfaces adjacent the periphery thereof, the hub element having a central barrel and an integral radial flange, the barrel extending entirely from one surface of said flange, said friction clutch plate having a central opening, damper springs mounted between said plate and flange, stop means limiting relative rotation between said plate and hub element and including a plurality of rivets, one of said plate or hub element having an arcuate slot receiving each rivet and the other of said plate or hub element having an opening aligned with said rivet, spring means cooperating with each rivet to bias the plate and hub element together and including a Belleville spring positioned on and compressed by each rivet and engaging the surface of said clutch plate, friction means positioned between said plate and hub element, and piloting means on said hub element cooperating with said plate to preserve the concentricity therebetween.

12. A two-piece driven plate asembly comprising a one-piece stamped hub element and a friction clutch plate carrying friction surfaces adjacent the periphery thereof, the hub element having a central barrel and an integral radial flange, the barrel extending entirely from one surface of said flange, said friction clutch plate having a central opening, damper springs mounted between said plate and flange, stop means limiting relative rotation between said plate and hub element and including a plurality of rivets, one of said plate or hub element having an arcuate slot receiving each rivet and the other of said plate or hub element having an opening aligned with said rivet, spring means cooperating with each rivet to bias the plate and hub element together and including an offset yeildable strap for each rivet, each strap includes one end secured to said clutch plate and the opposite offset end spaced therefrom, each said rivet being elongated with one end abutting said flange and the opposite end spaced from said clutch plate and operatively connected to said last mentioned offset strap end, friction means positioned between said plate and hub element, and piloting means on said hub element cooperating with said plate to preserve the concentricity therebetween.

13. A vibration damper assembly comprising a one-piece stamped hub element and a friction clutch plate carrying friction surfaces adjacent the periphery thereof, said hub element including a barrel and an integral radial flange, said barrel extending entirely from one side of the flange, a plurality of substantially equally spaced bosses in said flange extending from the side of the flange opposite said barrel, said flange having a plurality of spring pockets formed therein with an inner and an outer spring retaining lip for each pocket, a second set of spring pockets formed in said friction clutch plate and generally aligned with said first set of spring pockets, each spring pocket having an inner and an outer spring retaining lip, a damper spring received between said hub element and said plate in each aligned pair of spring pockets, said friction clutch plate having a central opening positioned over said bosses to pilot said plate relative to said hub element and a plurality of arcuate slots generally circumferentially aligned with the outer lips of said second set of spring pockets, said flange having a plurality of openings aligned with said slots, stop means to provide limited rotation between said plate and hub element comprising a rivet received in each aligned slot and opening and spring means cooperating with each rivet and engaging the surface of said flange or clutch plate, said spring means being compressed by said rivets to provide frictional drag between said plate and hub element, and friction means between said plate and flange.

14. A vibration damper assembly as set forth in claim 13, in which said friction means comprises a plurality of friction washers, one of said washers being received on each rivet.

15. A vibration damper assembly as set forth in claim 13, in which said friction means comprises a friction ring piloted on said bosses.

16. A two-piece driven plate assembly as set forth in claim 13, in which said spring means comprises a Belleville spring positioned on and compressed by each rivet and engaging the surface of said flange on the same side as said barrel.

17. A two-piece driven plate assembly as set forth in claim 13, in which said spring means comprises a Belleville spring positioned on and compressed by each rivet and engaging the surface of said clutch plate.

18. A two-piece driven plate assembly as set forth in claim 13, in which said spring means comprises a conical coil spring positioned on and compressed by each rivet and engaging the surface of said flange on said clutch plate.

19. A two-piece driven plate assembly as set forth in claim 13, in which said spring means comprises an offset yieldable strap for each rivet, each strap includes one end secured to said clutch plate and the opposite offset end spaced therefrom, each said rivet being elongated with one end abutting said flange and the opposite end spaced from said clutch plate and operatively connected to said last mentioned offset strap end.

* * * * *

UNITED STATES PATENT OFFICE
CERTIFICATE OF CORRECTION

PATENT NO. : 4,094,395

DATED : June 13, 1978

INVENTOR(S) : William Lee Brown

It is certified that error appears in the above—identified patent and that said Letters Patent are hereby corrected as shown below:

Column 4, line 42, cancel "pivoting" and insert -- piloting --.

Signed and Sealed this

Nineteenth Day of December 1978

[SEAL]

Attest:

RUTH C. MASON
Attesting Officer

DONALD W. BANNER
Commissioner of Patents and Trademarks